Jan. 30, 1962

W. J. DONOHUE 3,019,079

METHODS AND APPARATUS FOR CONTINUOUS
INTERACTION OF SOLIDS AND FLUIDS

Filed March 4, 1958

*INVENTOR.*
WILLIAM J. DONOHUE
BY
*ATTORNEYS*

INVENTOR.
WILLIAM J. DONOHUE
BY
ATTORNEYS 3,019,079
METHODS AND APPARATUS FOR CONTINUOUS
INTERACTION OF SOLIDS AND FLUIDS
William J. Donohue, Willoughby, Ohio
(432 East Drive, Baton Rouge 6, La.)
Filed Mar. 4, 1958, Ser. No. 719,083
11 Claims. (Cl. 23—1)

This invention relates to methods and apparatus for the continuous interaction of solids nad fluids. For example, the invention provides methods and apparatus which may be variously used to effect ion exchange reactions in fluids by contact of the fluids with solid ion exchange resins; to decolorize or purify fluids by contact with solid clays, activated carbon, bone char, molecular sieve materials, and the like, whereby constituents of the fluids or materials suspended therein are adsorbed on, filtered by, or chemically reacted with the solid material; or to effect a separation of suspended solids from a liquid feed material, with or without simultaneous interaction of the suspended solids and/or the suspending liquid with a particulate solid material used to effect the separation. These and a variety of related types of interaction between solids and fluids are all within the broad purview of the invention, as will be more fully explained herein.

More specifically, the present invention relates to methods and apparatus in which a particulate solid material is contacted sequentially with a plurality of fluids, including a fluid feed to be interacted physically and/or chemically with the particulate solid material, and at least one additional fluid for cleaning and/or regenerating, or otherwise reconditioning, the particulate material, and/or for recovering or separating therefrom any material adsorbed or extracted thereby from the fluid feed. Still more particularly, the invention relates to truly continuous methods and apparatus for effecting the interaction of fluids and solids, as distinguished from cyclic operations in which distinct cycles of operation of one character are separated in time by one or more other cycles, such as cleaning, regeneration, product recovery, and the like.

Most methods and apparatus for the interaction of fluids and solids employ fixed beds of the solid material through which the fluid feed is passed in a batch or cyclic-batch operation. Continuity of operation in such systems is sometimes maintained by switching a continuous fluid feed from one to another of a plurality of fixed beds, each bed being subjected to one or more separate cleaning, regeneration, or product recovery operations, or the like, between exposures to the fluid feed in the course of a complete operational cycle. Although such operations are normally classified as continuous, they are truly so only as regards the flow of the fluid feed, the treatment of the solids in the fixed beds being strictly batch operations. Apart from considerations of operating efficiency and apparatus complications, an inherent objection to such batch or partially batch systems is the lack of uniform conditions of reaction or interaction of the fluid feed and the fixed bed of solids as the latter progressively degenerates to the point where reconditioning of the bed is required.

Considerable improvement in the above mentioned fixed bed operations has been effected by the use of so-called "fluidized" beds of the solid material, in which a particulate solid material in a reaction chamber is maintained suspended in a stream of the fluid to be reacted therewith, the fluid being moved at a relatively high speed upwardly through the bed. Gravitational settling of the solids in the bed is opposed by the upwardly flowing fluid stream so that the solid particles are continually being caught in the fluid stream and carried upwardly again. By properly regulating the velocity of the fluid stream over the horizontal cross-section of the chamber and the size and quantity of the solid particles in the chamber, a high degree of reaction efficiency may be obtained in various types of reactions. Also, substantially uniform reaction conditions may be maintained by constantly withdrawing solids from the reaction chamber at one point for appropriate reactivation and constantly feeding reactivated solids back into the chamber at another point.

Such fluidized bed processes, however, also have numerous objections and limitations. Among these are: (1) the high fluid velocities required to maintain the bed in a fluidized condition, particularly where gaseous fluids are employed, so that only relative brief contact of a given gaseous increment with the solids is possible before such increment is exhausted from the chamber; (2) the restrictive limitations on the particle size of the solids which may be maintained in suspension in a stream of a given kind of fluid without being carried out of the reactor at too rapid a rate; (3) the high rate of attrition of the fluidized solid particles, which creates problems in the reuse of such particles, after reactivation, without altering in some manner the operating characteristics of the system; (4) the relatively great vertical height of the reaction chamber that is usually required due to the relatively low concentration of the fluidized solids, in order to achieve the required reaction time before a given increment of the solids-suspending fluid has passed completely through the reaction chamber. This latter characteristic of fluidized bed techniques has generally required that all solids reactivating operations be carried out to one side of the reaction chamber, and large plant floor or ground areas are required to accommodate the amount of piping, conveyors, pumps, solids reconditioning chambers, and the like that must be used to achieve the continuity and uniformity of operations in each auxiliary solids-contacting zone that is achieved in the principal reaction chamber.

The many advantages of a truly continuous system for the interaction of fluids and solids have long been recognized, and many other attempts have been made, with more or less success, to develop suitable, truly continuous, processing apparatus and techniques. So far as I am aware, no highly flexible scheme capable of general application to the varied problems in the art has been devised heretofore.

The principal objects of the present invention are to make possible, in a single column: (a) the continuous treatment of a fluid feed by its interaction, under uniform conditions, with a moving bed of particulate solid material in a treating zone, (b) the continuous reconditioning of the particulate material of the bed, in at least one additional zone, where reuse of such solid material is desired, (c) the continuous recovery of products and removal of waste materials, and (d) the continuous recycling of the particulate solid material to the treating zone or the continuous replacement thereof with new particulate material, as the nature of the process may require.

Another object of the invention is to provide methods and apparatus for the above purposes which are adaptable for a wide variety of operations in which fluids, including gases as well as liquids, are interacted with particulate solid materials.

Another object of the invention is to provide methods and apparatus for the above purposes in which a progressive, regulated movement of particulate treating solids from the top of a treating column to the bottom of the column is maintained, and in which the rate of such movement may be readily and accurately controlled to meet the needs of the particular process being carried out in the column.

Another object of the invention is to provide methods and apparatus for the above purposes in which substantially constant conditions of reaction or interaction between particulate treating solids, on the one hand, and both a fluid feed and at least one additional fluid reagent, on the other hand, are maintained in adjacent zones of a single treating column while preventing any substantial intermixing of said fluids.

Still another and more specific object of the invention is to maintain a plurality of distinct beds of particulate solid material in superposed zones of a single column, to separately interact different fluid materials with the solids in the respective zones, and to progressively move the solids in a controlled manner downwardly through each zone, downwardly from one zone to another, and out of the lowermost zone for recycling, recovery, or disposal as the nature of the process may require.

Still another object of the invention is to provide methods and apparatus of the character described in which the movement of particulate solids downwardly through each treating zone is effected entirely by gravity and is controlled by the mechanical movement of the solids from the bottom of one zone to the top of the next lower zone, and out of the column from the lowermost zone, the rates of withdrawal of solids from the bottoms of the several zones being substantially the same, but simultaneously adjustable, in order that the rate of movement of the solids through the column can be varied without affecting the distribution of solids throughout the column.

Still another object of the invention is to provide methods and apparatus of the character described in which the rates of flow of several fluids through their respective interaction zones may be independently varied over a substantial range as the nature of the process may require, with or without altering or adjusting the rate of progression of the particulate solid material through the column.

Still another object of the invention is to provide methods and apparatus of the character described in which the direction of fluid flow within each treating zone, relative to the downward progression of particulate solid material, may be made either countercurrent or co-current, independently of the direction of fluid flow in the other treating zones.

Still another object of the invention is to provide methods and apparatus of the character described in which attrition of the particulate solid material is minimized by slowly moving the solid particles in the presence of a quantity of fluid sufficient to maintain a fluid film about each particle and minimize frictional contact and impacts between particles.

The foregoing and other ancillary objects of the invention and their many consequent advantages will be more fully understood and appreciated from the following description of the general character of the invention and various illustrative embodiments thereof.

In accordance with the invention, an elongated, vertically disposed, columnar, hollow shell is divided into a plurality of superposed interaction chambers by a series of vertically spaced transverse partitions. In each of these chambers is disposed a generally horizontally extending tray for supporting a bed of particulate solid material. Each tray is relatively closely spaced above the transverse partition defining the bottom of the chamber in order to provide a solids transfer space therebetween in which solids may be moved radially while being transferred out of the bottom of the chamber to the next lower chamber or out of the bottom of the column from the lowermost chamber. A pair of radially offset, vertical openings are respectively defined by each partition and its superposed tray, a first one of said openings by-passing the tray and the second one by-passing the associated partition. In this way, a tortuous passageway leading out of the bottom of each chamber is provided, with radially offset vertical portions interconnected by a horizontal portion.

Mechanical means are provided in association with each treating chamber for moving solid particles radially over the tray therein for gravity fall through the first of said openings, into a transfer zone having a smaller effective cross-section than the treating chamber for restricting the rate at which the solids are moved to the next lower chamber, or out of the lowermost chamber. Within each transfer zone, the solids are then moved radially over the adjacent partition for gravity flow through the second of said openings into the next lower treating chamber or out of the bottom of the column from the lowermost treating chamber. The several mechanical means for effecting radial movement of solid particles, as described, are actuated together by a common driving mechanism so that their speeds of operation may be increased or decreased simultaneously in the same amount.

A bed of particulate solid material is supported in each treating chamber, by the tray therein, to a predetermined depth that is preferably somewhat less than the depth of the chamber above the tray in a non-fluidized bed. Where the bed is to be fluidized by upward fluid flow, even greater room for expansion of the bed solids from their depth when in a static condition may be required. Means are provided for continuously passing a fluid feed or fluid reagent into one end of each chamber, either upwardly or downwardly along a vertical path through the bed of solids therein, and out of the chamber at the opposite end thereof. The flow of each fluid is so regulated that it fills the treating chamber through which it passes and maintains a fluid pressure or pressure gradient therein so as to substantially prevent fluid flow from one chamber to another through the continually open, tortuous passageways described above, while permitting gravity fall of the heavier particulate solid material through each chamber and from chamber to chamber. Thus, the entire column is maintained full of fluids, and the different fluids are confined, or substantially confined, to their respective chambers while flowing through the beds of solid particles therein for interaction therewith, although the interaction zones containing the beds of solid particles are continually in open communication through the intervening solids transfer zones. At the same time, the particulate solid material comprising the several beds is progressively movable downwardly within each bed, downwardly out of the bottom of each bed from chamber to chamber through the intervening transfer zones, and out of the bottom of the column from the lowermost chamber through a solids outlet zone.

By maintaining a uniform average rate of feed of the particulate material, in terms of quantity of material per unit of time, into the top of the column for downward movement therethrough, and by progressively moving the particulate material from chamber to chamber and out of the bottom of the column at the same average rate, many advantages accrue in a system of the character described above. Among these are the following:

The solid particles comprising each bed are progressively renewed in a continuous manner at a rate subject to accurate regulation.

The substantially continuous movement of the bed solids prevents channeling of the beds by the action of the fluids flowing through them.

Separate fluids may be brought into intimate contact with the bed solids in a continuous manner while being substantially segregated in their respective zones.

The rate of flow of each separate fluid may be independently regulated in order to obtain the desired time of contact with the particulate solid material or in order to contact each increment of the particulate solid material with a desired quantity of each fluid in the course of travel of the solids through the column.

The flow of fluid in each treating zone may be established either countercurrent or co-current relative to the progression of solids through the column, independently of the directions of relative flow in the other zones.

By the selection of an appropriate diameter or cross-sectional area of the column for each zone in relation to the rate of circulation of fluid therethrough, the fluid velocity therein may be readily controlled to suspend or fluidize the solids in any one or more beds to any desired degree.

The movement of solids is slow and takes place at all times in a fluid medium so that attrition of solids is kept to a minimum and the movement of solids is facilitated.

Volumes of solid and liquid reagents may be kept to a minimum as a result of the truly continuous character of each part of the system.

Each part of the system maintains uniform reaction and/or interaction conditions at all times, which conditions are independently adjustable in each treating zone to achieve the desired results therein as the particular process may require.

The foregoing advantages of the invention, and others which could be enumerated, are such that the invention may be adapted, in all of its important details, to a wide variety of processes in which fluids, i.e., liquids or gases, are interacted with particulate solids capable of settling in the fluids employed.

In the foregoing general description of the invention, reference has been repeatedly made to the maintenance of two or more superposed treating zones of a broadly similar character. Depending upon whether the particulate solid material being moved downwardly through these zones is to be recycled or not, whether the fluids to be reacted or interacted with this solid material are liquids or gases, or one or more are liquids and one or more are gases, and various other considerations, the order in which the plurality of separate fluid-solid reactions are arranged vertically in the column may be subject to considerable variation. For example, in a typical ion exchange process, the several fluids may all be liquids and may include, in sequence, a liquid feed in which ions are to be exchanged, one or more rising liquids for separating an entrained residue of treated liquid feed from the ion exchange resin, a regenerating liquid for reconditioning the ion exchange resin, and one or more rinsing liquids for separating an entrained residue of regenerating liquid from the ion exchange resin before recycling the latter for repeated contact with liquid feed. So long as the sequential order of steps required in such a process is maintained, it is a matter of choice as to which of them is performed in the uppermost treating zone, since the ion exchange resin may be recycled from the lowermost zone and move continuously from zone to zone in an endless closed cycle of operational steps.

The same flexibility of design exists where all of the fluids are gases, rather than liquids. However, where one or more of the fluids are gases and one or more are liquids, all of the liquid handling zones should be disposed in sequence in a lower portion of the column and all of the gas handling zones should be disposed in sequence in an upper portion of the column. Where the particular process does not lend itself to such an overall arrangement, it may be necessary to break the process down into two or more groups of steps, each group of steps being arranged as stated and housed in a column separate from the other group or groups.

In order to describe the invention in greater detail, reference will now be made to illustrative systems and to the accompanying drawings in which.

Figure 1:
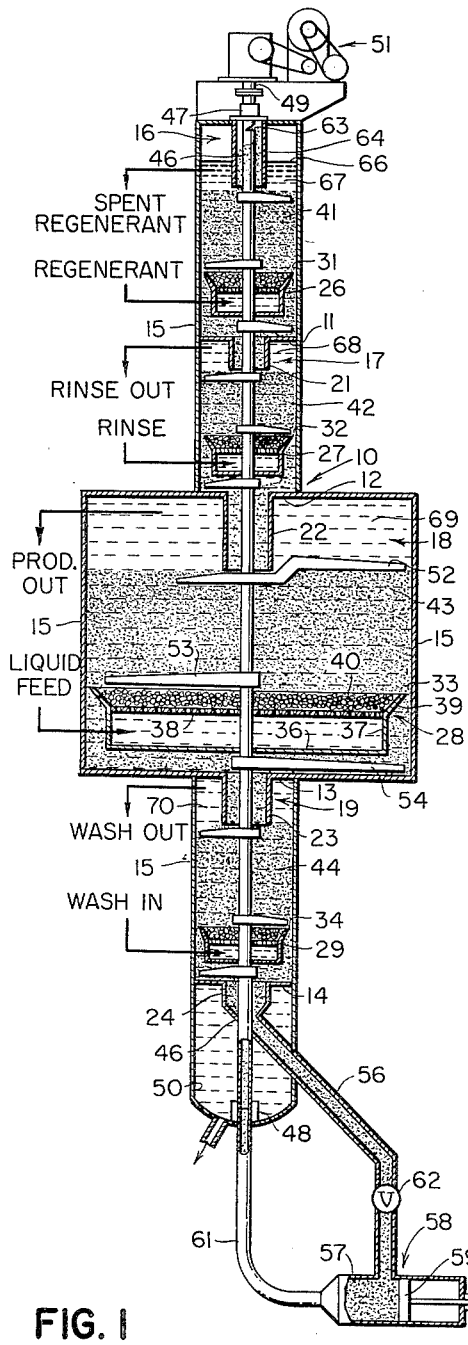
FIGURE 1 is an elevation, largely shown in vertical section, and somewhat diagrammatically, of apparatus for carrying out a typical ion exchange reaction utilizing a solid, particulate, ion exchange resin, a liquid feed to be reacted with the resin, and liquid reagents to be reacted or interacted with the resin.
Figure 4:
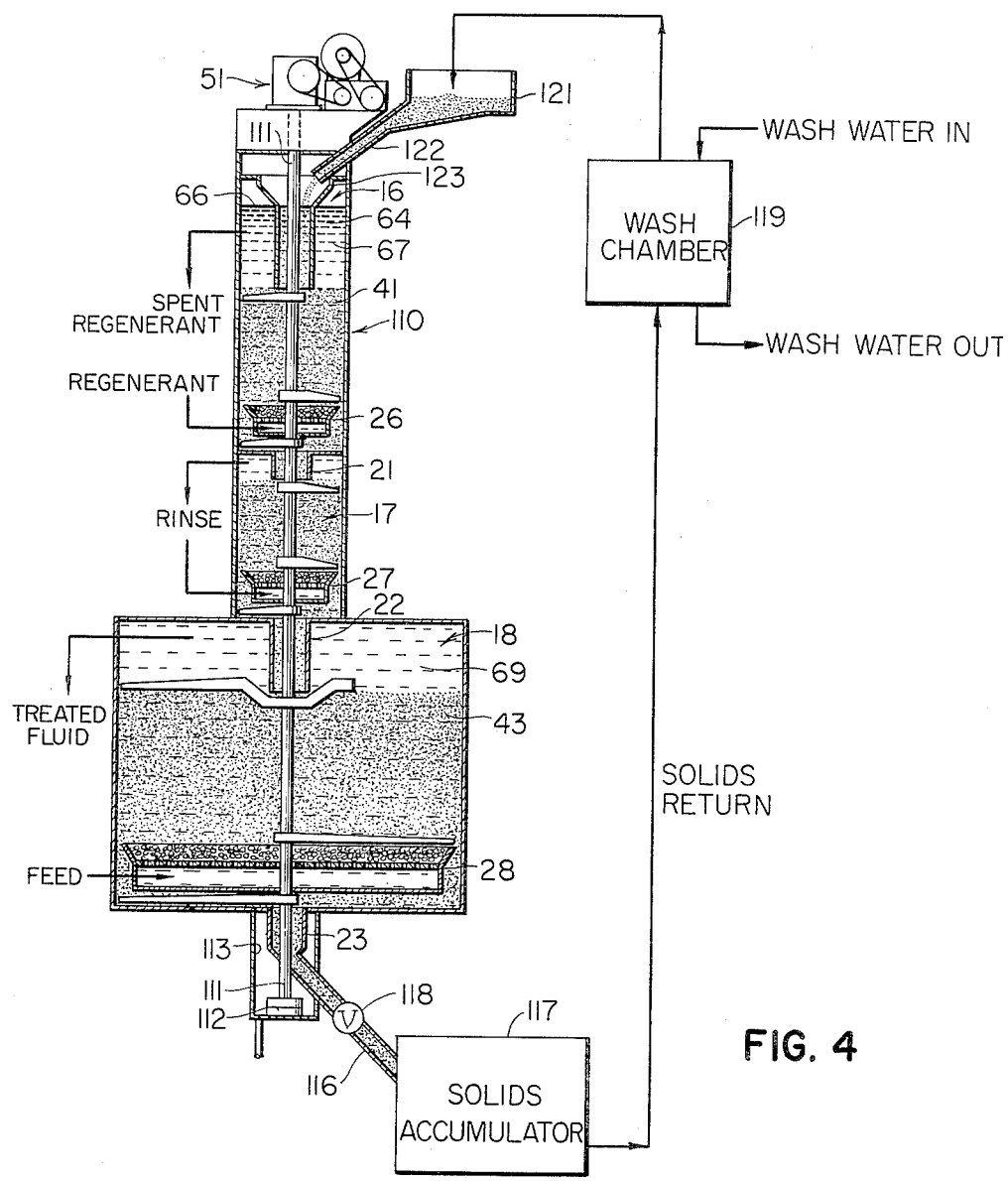
FIG. 4 is an elevation similar to FIG. 1 showing another modified form of apparatus for carrying out a typical ion exchange reaction of the same general character for which the apparatus of FIG. 1 is adapted.
Figure 5:
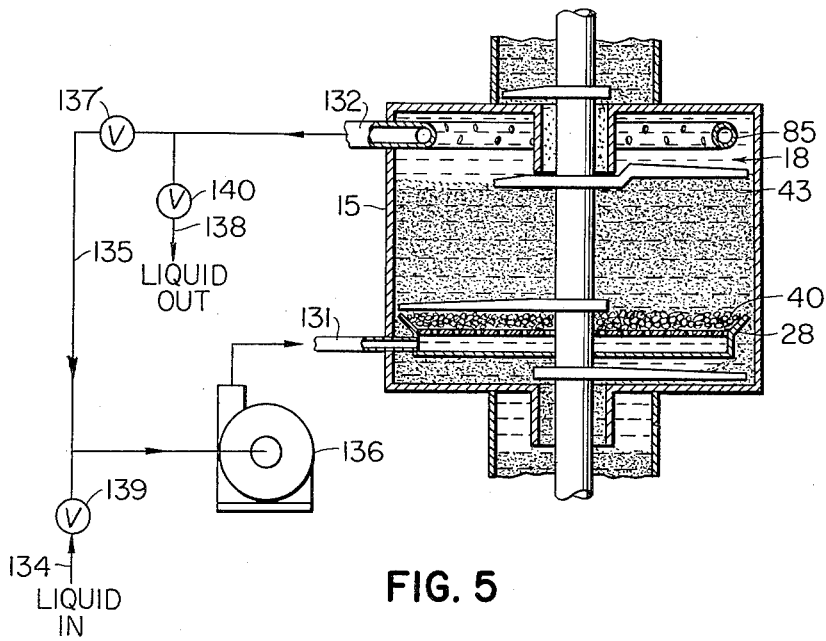

FIG. 5 is a fragmentary vertical section of the apparatus of any of the preceding figures, showing in greater detail how a liquid may be circulated through a solids-contacting chamber in the column of FIG. 1 or FIG. 4 in a direction countercurrent to the movement of the solids therein, the equipment for handling the liquid externally of the column being shown diagrammatically for greater simplicity.

Figure 6:
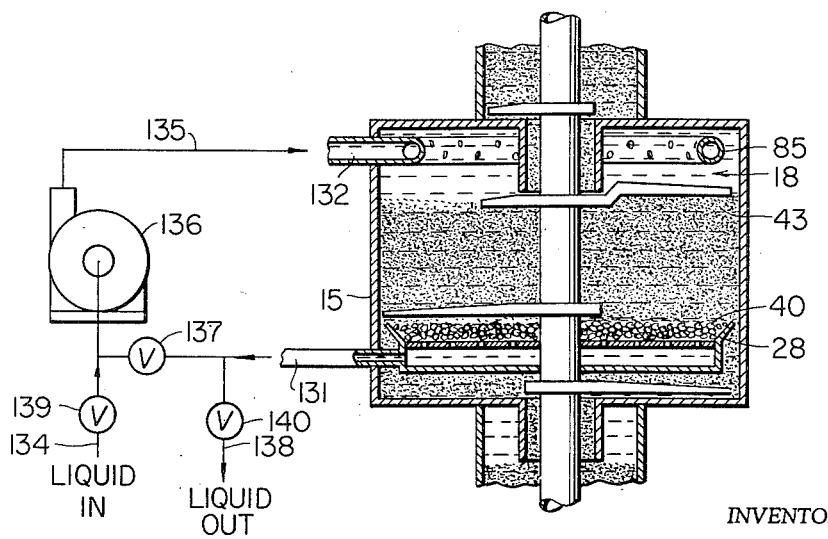

FIG. 6 is a view similar to FIG. 5 but modified to show how a liquid may be circulated through a solids-contacting chamber in the same direction as the movement of the solids therethrough.

Referring to the apparatus of FIG. 1, there is shown therein a vertically elongated, columnar, hollow shell 10, which may suitably be circular in horizontal cross-section. A plurality of horizontal partitions 11, 12, 13, and 14, suitably mounted on or formed integrally with the side wall 15 of the shell 10, divide the interior of the shell into a series of superposed compartments or solids-contacting chambers 16, 17, 18, and 19, respectively defined by the partitions. Each of the partitions 11, 12, 13, and 14 has at least one opening therethrough for permitting solids to pass through the partitions at a controlled rate as hereinafter described. A single, central opening through each partition, as shown, is preferred for this purpose.

Each of the partition openings leads into a length of conduit so as to provide what may be termed solids "downcomers" 21, 22, 23, and 24, respectively mounted on and depending from the partitions 11, 12, 13, and 14. The downcomer conduits assist in controlling the rate of movement of solids downwardly from one chamber to the next or, in the case of the lowermost solids-contacting chamber 24, to a solids return system hereinafter described. The length of the downcomer conduits 21, 22, and 23 determines the height of beds of solids in the chambers 17, 18, and 19 into which these downcomers respectively discharge. The length of the lowermost downcomer conduit 24 is unimportant, this downcomer merely serving as a weir from which solids may be conducted to the solids return system.

A series of horizontally disposed solids supporting trays 26, 27, 28, and 29 are respectively disposed in the chambers 16, 17, 18, and 19. These trays are respectively associated in spaced relationship with the partitions 11, 12, 13, and 14 and in axial alignment with the openings through the partitions into the downcomers. At their extreme peripheries, the trays 26, 27, 28, and 29 are preferably spaced from the shell wall 15, either continuously or at spaced locations about the trays, to provide a restricted opening or a multiplicity of restricted openings 31, 32, 33, and 34 for solids to by-pass the trays and move downwardly along defined paths leading toward the downcomers. The trays may be supported in position in any desired manner, as by means of spider-like brackets (not shown) connecting the trays to the shell side wall 15 so as to permit solids to by-pass these tray supports without undue restriction.

By virtue of the above described structure, the openings 31, 32, 33, and 34 at the peripheries of the trays are laterally or radially offset out of alignment with the openings through the partitions 11, 12, 13, and 14 into the downcomers 21, 22, 23, and 24. Thus, a tortuous, restricted passageway for movement of particulate solids out of the bottom of each chamber is provided, which passageway leads radially and horizontally over the associated partition. This restricted passageway, from the opening 31, 32, 33, or 34 to the bottom of the associated downcomer 21, 22, 23, or 24, constitutes what is herein designated a transfer zone, and each transfer zone is continually in open communication with the adjacent pair of interaction zones.

The several trays 26, 27, 28, and 29, although not necessarily of the same size and proportions in view of the optionally different cross-sectional areas of the solids-contacting chambers in which they are respectively mounted, are preferably of the same general design. Thus, a description of one will be applicable to the others. Referring to the tray 28 disposed in the largest chamber 18, it may suitably comprise an imperforate bottom plate 36 and a side wall 37 defining a lower fluid receiving pan. The top of this pan may be covered by a load supporting, perforated grill 38 surrounded by an outwardly flaring imperforate rim 39 defining an upper pan-like structure for holding a size graduated, stationary bed of stone, gravel, and sand or other size graduated, inert, granular material 40. Thus, fluid introduced into the lower fluid receiving pan of the tray may flow upwardly through the grill 38 and the granular bed 40 and into and through the moving bed of particulate solids in the contacting chamber 18.

The stationary bed 40 of granular material will have the coarsest granules at the bottom to permit the use of sizeable perforations in the tray grill 38. The finer granules on top of this bed 40 will aid in keeping fine particulate solids supported on this bed from working downwardly therein. The use of such a porous bed aids in uniformly distributing the upward flow of fluid from the tray.

The solid particulate material with which a liquid product is to be treated is distributed through the column in distinct beds 41, 42, 43, and 44, which are respectively supported in the solids-contacting chambers by inert granular material on the trays 26, 27, 28, and 29, and also in the passageways and downcomers provided for guiding and restricting movement of the particulate solids out of the bottom of each chamber. While the solids transfer zones may not be completely full of the particulate solid material at all times (except for intersticial fluid), it is contemplated that this condition will at least be closely approached throughout normal operation of the system.

In order to control the distribution of solids through the column and aid in effecting downward movement of the solids therethrough, a number of rakes are mounted on a central, rotatable shaft 46, which shaft is preferably a hollow tube for additional purposes hereinafter described. The rotatable shaft 46 may be journaled in and supported by a suitable, upper, thrust bearing structure 47 at the top of the shell 10 and may be journaled in another suitable bearing 48 at the bottom of the shell, the latter bearing preferably being provided with suitable liquid seals (not shown) and the lower end of the hollow shaft 46 terminating within this combination bearing and seal 48. Coupled to the upper end of the rotatable shaft 46 is a drive shaft 49 that is rotatable by any suitable motor, drive, and speed control unit, generally designated 51, mounted on the top of the shell 10.

The lowermost portion of the shell 10 may be utilized to provide back pressure resisting any tendency for fluid to leak downwardly about the shaft 46 from the chambers above or upwardly from the combination bearing and seal 48. For this purpose a lowermost chamber 50 may be kept full of water or other liquid under sufficient pressure at all times to aid in holding the pressure head in the chambers above while also providing a back pressure around the combination bearing and seal 48 to minimize leakage of liquid out of the shaft 46 at its junction with the conduit 61 described below.

Three rakes, mounted on the shaft 46 for rotation therewith, are associated with each of the solids-contacting chambers and its bottom outlet passageway. The arrangement and general design and functions of each such set of three rakes may be the same, although the rakes of one set may differ in size and proportions from those of another set in view of the optionally different cross-sectional areas of the chambers in which they are mounted. Thus, a description of one set of three rakes will be applicable to the other sets.

Referring to the rakes associated with the largest chamber 18 and its bottom outlet passageway, an uppermost rake 52 is mounted on the shaft 46 immediately below the downcomer 22 from the superposed chamber 17. This rake may be of any conventional design for pushing the particulate solids issuing from the downcomer 22 in radially outward directions so as to maintain a substantially uniform depth of the bed 43 of solids in that chamber, the height of which bed is obviously limited substantially to the level of the lower end of the downcomer 22.

Immediately above the inert granular bed 40 on the tray 28 is an intermediate rake 53 which, like the uppermost rake 52, may be of any conventional design for pushing the particulate solids in radially outward directions as they are fed downwardly in the bed 43. This rake is also mounted on the shaft 46 for rotation therewith, and its function is to move the particulate solids from the center of the bed 43 toward the periphery thereof for discharge through the peripheral aperture or apertures 33 defined by the rim 39 of the tray 28.

Immediately above the partition 13 and below the tray 28 is a lowermost rake 54. This rake may be of any conventional design for pulling particulate solids radially inwardly toward the downcomer 23. This rake is also mounted on the shaft 46 for rotation therewith and serves to move the solids falling by gravity through the peripheral opening or openings 33 inwardly along a horizontal path for gravity fall through the downcomer 23.

Solids fed in this way from the lowermost bed 44 into the downcomer 24 settle therein through the funnel shaped bottom thereof and through a suitable conduit 56, and gradually accumulate in the barrel 57 of a solids pump 58 of the positive displacement type.

As the solids accumulate in the pump barrel, they gradually replace much of the liquid therein.

The pump 58 may have a piston 59 mounted for reciprocation therein and powered by a steam or compressed air engine 60, or the like. The gradual flow of solids into the pump barrel 57 is preferably in a radial direction and may continue with the pump piston remaining retracted, as shown, until the barrel ahead of the piston is substantially full of solids forming a self-sustaining bed with liquid wash medium from the chamber 19 filling the interstices of the bed. Thereupon the pump piston is moved forward on a working stroke to force the solids and permeating liquid out of the pump in an axial direction through a funnel shaped pump outlet into a conduit 61. A suitable check valve 62 in the conduit 56, operative to close this conduit only in response to upward flow therein, may be employed to insure the desired direction of flow out of the pump during the working stroke.

The pump outlet conduit 61 leads to and may substantially abut the lower end of the hollow rotatable shaft 46 inside the combination bearing and seal 48. Thus, solids and some liquid are forced through the conduit 61 and upwardly through the hollow shaft 46. Adjacent its upper end the shaft 46 is provided with any desired form of solids outlet opening 63 for discharging solids back into the top of the column 10. The discharge portion of the shaft 46 is surrounded by another downcomer 64 which serves to fix the maximum level of the bed of solids 41 in the uppermost solids-contacting chamber 16.

The action of the pump 58 in pushing a self-sustaining bed of solids through the conduit 61 and up the shaft 46 will have a tendenecy to cause some packing of the solids in the conduit 61 and shaft 46, and this packing tendency will impede reverse movement of the solids while the pump piston is slowly retracted. However, liquid permeating this mass of packed solids during the working stroke of the pump will tend to drain downwardly and back into the pump. Thus, by having the solids outlet 63 high enough above the liquid level 66 in the column (where a liquid feed is used) and by selecting a pump displacement slightly less than the volume of the interior of the shaft 46 between the highest liquid level 66 and the solids outlet 63, the liquid in the shaft 46 will seek the same level 66 while the pump piston is withdrawn and will never reach the height of the solids outlet 63 during the working strokes of the piston. In this manner, solids may be discharged out of the opening 63 into the top of the column without forcibly pumping liquid wash medium with the solids. Therefore, only amounts of liquid wash medium physically coating the discharged solids will be carried into the uppermost solids-contacting chamber 16.

Where all of the fluids with which the particulate solid material is to be contacted in the column 10 are liquids, the column is full of liquid (except for the volume occupied by the solids) up to a level 66 in the uppermost solids-contacting chamber 16. By way of example, these liquids may include: a regenerant liquid 17 in the uppermost chamber 16 for reactivating spent solids; a rinse liquid 68 in the next lower chamber 17 for washing residual regenerant liquid out of the downwardly moving solids; a liquid (termed "product" for convenience) in the next lower chamber 18 which is to be reacted with or in some manner acted upon by the reactivated and rinsed solids moving downwardly from the chamber 17; and a wash liquid in the lowermost chamber 19 for washing residual product liquid out of the solids moving downwardly from the chamber 18. As indicated by arrows in FIG. 1, these several liquids are continuously introduced through the trays mounted in the respective superimposed chambers for upward flow of the liquids through the beds of solids, and the liquids are continuously withdrawn from adjacent the tops of the respective chambers.

Each of the several liquids in the respective solids-contacting chambers is in contact with a different liquid in the chamber above or below it, or both. While there will be some intermixing of liquids in the solids transfer zones where such contact occurs, depending on many variables, this intermixing is kept to a minimum. By careful regulation of the flow through the several sets of liquid inlets and outlets, so as to create only such pressure differential from chamber to chamber as would exist by virtue of the liquid head alone, there is no pronounced tendency for liquid to flow from one chamber to another, and any tendency for such flow to occur is further restrained by the closely packed particulate solids that preferably and normally substantially fill the solids transfer zones between chambers and the solids outlet zone at the bottom of the column (except for intersticial spaces). About the only factors tending to cause flow of liquid from one solids-contacting chamber into an adjacent one are the tendency of downwardly moving solids in the solid transfer zones to entrain some liquid from one chamber and carry it into the next, and the tendency of differences in specific gravity of the several liquids to cause gravitational dispersion of the liquid of one chamber into the liquid of an adjacent chamber. These factors cause little intermixing, and for most purposes the effect thereof will be practically negligible. Thus, the respective fluid contents of the solids transfer zones and of the solids outlet zone at the bottom of the column are in substantially static communication with the fluid contents of the respective, adjacent, interaction zone.

From the foregoing description of the apparatus of FIG. 1, the normal manner of operating it will be apparent and requires but a brief further summary. Considering the situation in which a liquid feed is to be processed by contact with an ion exchange resin in order to substitute one ion for another in the liquid feed, this feed is continuously introduced into the bottom of the large solids-contacting chamber 18 for upward movement through the bed 43 of solids; and the product liquid 69, resulting from ion exchange between the solid resin and the liquid feed, is continuously withdrawn at the same rate adjacent the top thereof, the chamber 18 being full of liquid as indicated in the drawing. The other liquids are similarly introduced into and withdrawn from their respective chambers. These liquids may be: a conventional resin regenerating liquid 67 filling the uppermost chamber 16 up to the level 66; a rinsing liquid 68, such as plain water, filling the next lower chamber 17; and a wash liquid 70, which may also be plain water, filling the lowermost chamber 19.

The ion exchange resin particles are disposed in liquid permeated beds that substantially fill each of the solids-contacting chambers 16, 17, 18, and 19 up to the lower ends of the respective downcomers 64, 21, 22, and 23. Similarly, liquid permeated ion exchange resin particles substantially fill each solids transfer zone between the opening or openings 33 at the top thereof and the outlet of the downcomer at the bottom thereof. In these solids transfer zones, the liquid is substantially static or immobile, whereas the resin solids are falling or settling onto the horizontal partitions, whence they are raked inwardly for further, similar settling through the downcomers.

Spent and washed resin solids in the liquid washing medium are similarly constantly removed from the lowermost solids-contacting chamber 19 and are pumped up the shaft 46 with the intermittent movement described above. As explained, the wash medium not only fills the interstices between the particles of resin solids in the chamber 19 and downcomer 24, but also in the conduit 56, pump 58, conduit 61 and shaft 46 up to a fluctuating level in the shaft 46 between the level 66 and a level just below the opening 63.

The thoroughly washed but substantially liquid-free resin particles discharged from the opening 63 fall into the regenerant liquid 67 and settle therein to the bottom of the downcomer 64, whence they are spread over the top of the bed 41. The resin particles move downwardly in the bed 41 countercurrent to the regenerant liquid 67 and are discharged from the bottom of this bed as regenerated resin solids.

The regenerated resin solids are then moved into the next lower chamber 17 for downward movement therein countercurrent to the rinse liquid 68 and are discharged from the bottom of this chamber as washed resin solids in an active ion exchange condition.

The reactivated and washed resin solids are then moved into the next lower chamber 18 for downward movement therein countercurrent to the liquid feed which reacts therewith and is thereby converted into the desired liquid product while exhausting the resin solids to a substantially inactive condition.

The exhausted resin solids are then moved into the lowermost chamber 19 for downward movement therein countercurrent to the wash liquid, which serves to wash the resin particles free of any of entrained liquid feed or product liquid from the chamber above.

From the chamber 19, the inactive, washed, resin solids are recirculated to the top of the column in the wash liquid medium, as described above, the washing process actually continuing until the resin solids are pushed above the highest liquid level in the shaft 46 for discharge from the opening 63 near the top of the column 10.

In the above operations, the rotation of the shaft 46 and rakes mounted thereon will normally be quite slow, often of the order of several minutes or more per revolution. The movement of the pump piston 59 will also be slow, with a substantial delay between working strokes while the piston is retracted, as shown, in order to permit a gradual accumulation of resin solids in the pump chamber until it is substantially full of solids with a minimum amount of wash liquid therein. Also, the rotation of the shaft 46 and the rakes may be made intermittent, if desired, in order to further retard the rate of movement of solids and thereby prolong the time that each increment of resin solids remains in each chamber, as needed for most effectively accomplishing the regeneration, rinsing, ion exchange, and washing functions with the particular resin and liquids employed in the system. Thus, while the movement of resin solids may not be strictly continuous, they are progressively moved through the system in what is, in practical effect, a continuous operation.

Similarly, any of the several liquid flows may be intermittent, if desired for any reason, without altering the essentially continuous character of the system. However, it is contemplated that actual continuous flow of each of the several liquids will be desired, the rates of flow and dimensions of each chamber being selected to give the desired liquid-solids contact time, in the case of a true liquid-solids reaction, and to move the desired quantity of each liquid through each increment of solids where only a physical washing or scrubbing action is involved.

Figure 2:
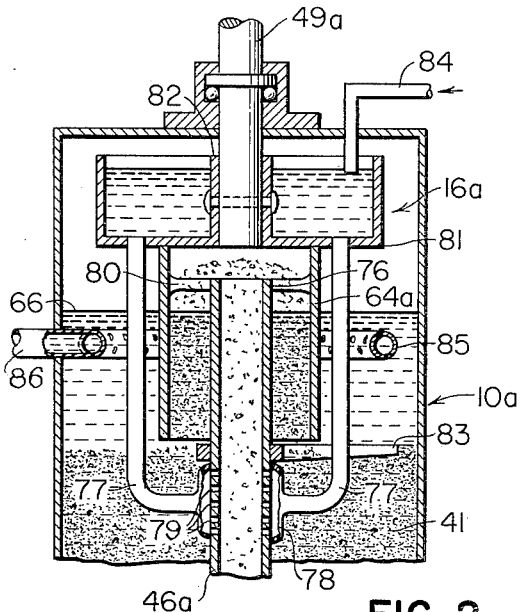
FIG. 2 is a fragmentary vertical section of the upper portion of apparatus of the general character shown in FIG. 1 but modified to provide for a different scheme for washing particulate solid material while it is being recycled.
Figure 3:
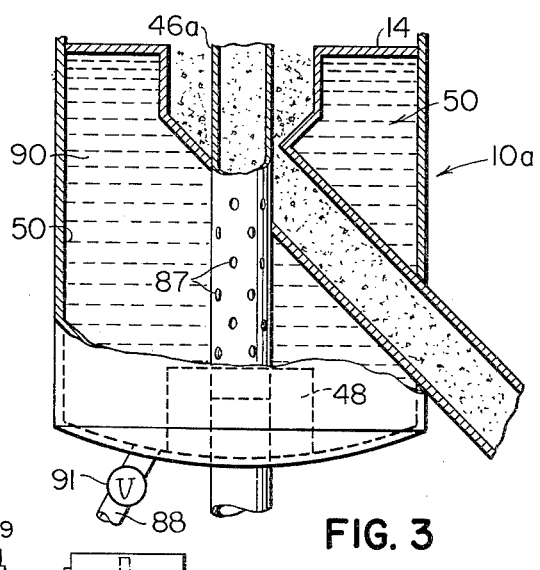
FIG. 3 is a fragmentary vertical section of the lower portion of the modified apparatus of FIG. 2.

FIGS. 2 and 3 illustrate how the system of FIG. 1 may be modified in order to more effectively use the shaft 46 as a liquid-solids contacting chamber. This may be desired to further supplement the washing action taking place primarily in the lowermost chamber 19, or to supplement the regenerating action of the regenerant liquid in the uppermost chamber 16, or to entirely replace one or the other of these uppermost and lowermost chambers, or to carry out an additional fluid-solids contacting operation without adding an additional chamber to the top or bottom of the column.

Referring to FIG. 2, in which some of the reference characters of FIG. 1 are employed to designate corresponding parts, a modified rotatable shaft 46a extending vertically through the column 10a may terminate with an open upper end 76 for discharging particulate solids moved upwardly therethrough. In order to provide for supporting and rotating the shaft 46a while also flowing additional liquid downwardly therethrough countercurrent to the solids, the shaft 46a may be suspended from two or more arms 77 serving to support and drive the shaft while also serving as liquid feeding conduits. These arms may have hollow, belled, lower ends 78 welded or otherwise rigidly secured to the shaft 46a about a multiplicity of openings 79 in the wall of the shaft. The openings are of a size to permit liquid flowing downwardly through the supports 77 to continue through the openings into the shaft while precluding the movement of particulate solids in the reverse direction through the openings. Any suitable screens (not shown) may be used over or in the openings to permit liquid to flow therethrough while holding back reverse movement of any solids through the holes.

For greater support of the shaft 46a, a spider 80, permitting solids to move downwardly therethrough, may connect the upper end of the shaft to a surrounding downcomer 64a.

The upper ends of the supports 77 are welded or otherwise secured to the bottom of an annular fluid reservoir 81 in communication with the interior thereof. The reservoir 81 is provided with a hollow central boss 82 in which a drive shaft 49a is rigidly secured in any desired manner for supporting and rotating the reservoir structure 81, the suporting arms 77, and the shaft 46a as a unit.

The downcomer 64a surrounding and secured to the upper end of the shaft 46a is welded or otherwise secured to the bottom of the reservoir structure 81. This downcomer also rotates with the structure from which it is suspended, but is otherwise similar to the downcomer 64 of FIG. 1 in its mode of operation in controlling the height of a bed of particulate solids in the uppermost chamber 16a of the modified column 10a.

Any suitable rake 83 may be mounted on the shaft 46a adjacent the lower end of the downcomer 64a for rotation with the shaft 46a to spread the solids discharged from the downcomer in radially outward directions for leveling the bed of solids in this chamber of the column 10a.

A liquid feeding conduit 84 may enter the column 10a through the upper end thereof for discharging liquid into the reservoir 81 at a rate controlled to maintain a substantial volume of liquid in the reservoir as the liquid flows therefrom and downwardly through the hollow supports 77 into the shaft 46a.

Within the chamber 16a, and below the liquid level 66 therein, a toroidal, perforated conduit 85 communicating with an imperforate conduit 86, may be mounted above the top of the solids bed 41 for withdrawing spent regenerant liquid from the upper part of the chamber 16a. The balance of the regenerant liquid circulation system, utilizing such an arrangement of conduits, is disposed outside the column and is described below with reference to FIG. 5.

Referring to FIG. 3, the lower end of the column 10a, below the lowermost solids-contacting chamber, may comprise a liquid chamber 50 through which the shaft 46a passes as in FIG. 1, with the bearing and seal 48 surrounding the lower end of the shaft. Within the chamber 50, the shaft 46a is provided with a multiplicity of openings 87 of a size selected to permit liquid flowing downwardly through the shaft for discharge into the chamber 50 while precluding the discharge of particulate solids therethrough. As in the case of the openings 79 adjacent the upper end of the shaft, the openings 87 may be screened in a suitable manner, if necessary, to hold back the particulate solids. The outlet conduit 88 is in the bottom of the chamber 50 and is employed for draining therefrom the liquid flowing into the chamber through the openings 87.

Considering, for example, the modification of the system of FIG. 1 by incorporation of the features of FIGS. 2 and 3, the modified upper chamber 16a, of slightly greater depth than the upper chamber 16 of FIG. 1, would be utilized with the modified shaft 46a and associated structure of FIG. 2 mounted as shown. The lowermost chamber 50 of FIG. 1 may be unchanged, except that it will be full of a liquid 90 fed into it through the shaft 46a from the reservoir 81. This liquid, as indicated above, may be the same wash liquid 70 circulated through the chamber 19 of FIG. 1, or it may be a different liquid as far as the manipulation of the system is concerned.

The liquid 90 is continually fed into the reservoir 81 at a controlled rate to compensate for its average rate of withdrawal through the hollow supports 77, which latter rate will fluctuate intermittently or cyclically because of the intermittent upward surges of particulate solids in the shaft 46a caused by the pump 58. This liquid will flow into the shaft 46a and filter downwardly therethrough. By maintaining a back pressure on the liquid in the lowermost chamber 50, as by means of an adjustable pressure relief valve 91, or the like, interposed in the outlet conduit 88, the pressure in the chamber 50 may be regulated to balance the head of liquid in the column 10 up to the level 66. As will be observed, this liquid head is necessarily encountered in the chamber 50 when the piston 59 of the pump 58 is retracted. The greater height of the liquid in the reservoir 81 will tend to provide a greater pressure head in the shaft 46a, but this tendency will be constantly counteracted by the ability of the liquid 90 from the reservoir 81 to flow downwardly through the hollow supports 77 and shaft 46a, out of the lower openings 87 of the shaft into the lowermost chamber 50, and out of the lowermost chamber 50 through the outlet conduit 88. The downward flow of liquid through the shaft 46a which is established in this manner will be only momentarily interrupted, or impeded to some degree, by the intermittent working strokes of the pump, which force small quantities of liquid out of the pump through the conduit 61 in opposition to such downward flow. As a result, small amounts only of wash liquid 70 from the solids-contacting chamber 19 may find their way into the liquid chamber 50. Also, the liquid level in the shaft 46a will not rise substantially above the level 66 of the surounding regenerant liquid 67 in the uppermost chamber 16, so long as the rate of downward flow of liquid through the hollow supports 77 is limited so that it does not exceed the average capacity for downward liquid filtration through the mass of solids in the shaft 46a.

The operation of such a modified system is identical with that of the system of FIG. 1, except for the different character of the countercurrent liquid-solids contact achieved in the modified shaft 46a. As indicated above, this countercurrent liquid-solids contact may be used to effect additional washing of spent resin solids, or, by eliminating the solids-contacting chamber 19, may constitute the only washing of the spent resin solids before they are discharged into the top of the column for regeneration.

Referring now to the system illustrated in FIG. 4, the lowermost solids-contacting chamber 19 of FIG. 1 has been eliminated, as last suggested above, and suitable apparatus located entirely outside of the column 110 is utilized to wash solids discharged from the bottom of the column and to return them to the top of the column for regeneration and reuse. In this case, a solid central shaft 111 may be rotatably mounted in the column 110 for supporting and rotating the various rakes in the same manner as in the system of FIG. 1. The shaft 111 may be supported by a lower thrust bearing 112 in the bottom of the column within a bottom chamber 113, which otherwise serves only to control downward leakage of liquid about the shaft.

In other respects, the column of FIG. 4 and associated parts may be substantially identical with those of FIG. 1, both in structure and in function, and the principal identical features of the two systems are indicated by the same reference characters and will not be redescribed.

Referring to the external apparatus for collecting solids discharged from the lowermost solids-contacting chamber 18 through its downcomer 23, such apparatus may comprise a conduit 116 connected to the downcomer 23 and to a suitable solids accumulating reservoir 117. The solids accumulator 117 may be a closed pressure resisting container for holding solids and liquid against the liquid head in the column 110. A suitable check valve 118, which will close the conduit 116 in response to reverse flow therein, is preferably located in the conduit 116.

Any desired kind of apparatus may be employed for discharging accumulated solids from the accumulator 117 and transporting them into a wash chamber 119, which may also be of any desired form equipped with an inlet and an outlet for wash water or other liquid washing medium. If desired, for example, the apparatus for transporting the liquid permeated solids from the accumulator to the washing chamber along the route indicated by arrows may be a conventional, intermittently operating, compressed air lift (not shown), the check valve 118 serving to permit excess pressure to be intermittently developed in the accumulator for this purpose without disturbing the body of liquid in the column 110. In this case, the wash chamber 119 may suitably be an open tank disposed at such an elevation that the level of a liquid wash medium maintained therein will be the same as the liquid level 66 in the column 110. Thus, between operations of a solids air lift or the like for moving solids from the accumulator into the wash chamber, the liquid pressure head maintained on the accumulator by the liquid level in the wash chamber will balance the equal pressure head maintained on the accumulator by the liquid in the column 110.

Similarly, any desired form of apparatus may be employed for transporting washed solids from the wash chamber 119 to other apparatus, such as a kiln for regeneration, or to the top of the column 110 for reuse therein, as indicated by arrows in the drawing. The solids from the wash chamber may be received in a suitable bin or hopper 121 and fed by gravity therefrom down a chute or conduit 122 into a funnel shaped receiver 123 at the upper end of the downcomer 64 in the solids-contacting chamber 16.

As will be apparent from the foregoing, spent ion exchange resin solids, or the like, are fed to the accumulator 117 by means of the conduit 116, are collected in the accumulator, and are removed as desired into the wash chamber 119. After being washed to the desired degree in the wash chamber by a liquid washing medium, introduced and withdrawn as indicated by arrows in the drawing, the solids are conveyed and discharged at a desired rate into the top of the column 110 for reuse therein, or to other apparatus for regeneration or disposal.

FIGS. 5 and 6 show alternative schemes for circulating any desired liquid medium through a bed of particulate solids in any one or all of the solids-contacting chambers of FIGS. 1 and 4. Referring first to FIG. 5, a representative solids-contacting chamber 18 is shown equipped as in FIG. 1 or FIG. 4 for maintaining a bed of particulate solid material 43 therein on a hollow tray 28. As in FIGS. 1 and 4, the particulate solid material is moving substantially continuously in a downward direction, onto the top of the bed, through the volume occupied by the bed, and out of the bed around the periphery of the tray 28. A liquid inlet conduit 131 passes through the side wall 15 of the chamber and the side wall of the hollow tray 28 for feeding a liquid medium into the tray and upwardly through its perforated top, through the stone or other coarse granular material 40 thereon, and through the bed of solids 43 so as to maintain the chamber full of liquid. A perforated toroidal conduit 85 serves to collect the liquid above the bed of solids and adjacent the top of the chamber for discharge through a connecting liquid outlet conduit 132 passing through the side wall 15 of the chamber.

The liquid handling equipment connected to the conduits 131 and 132 externally of the chamber 18 is shown diagrammatically and includes a liquid supply line 134 leading into a liquid circulating line 135 connected at one end to the liquid inlet conduit 131 and at its opposite end to the liquid outlet conduit 132. A pump 136 is interposed in the line 135 for circulating liquid, and a valve 137 is interposed therein to aid in controlling liquid circulation. A liquid withdrawal line 138 is also connected into the circulating line 135. Additional valves 139 and 140 are interposed in the supply and withdrawal lines, as shown.

With the pump 136 in operation and the valves 137 and 139 open and appropriately adjusted, liquid will be pumped into the chamber and upwardly therein countercurrent to the downward movement of solids in the bed 43. When the chamber and circulating line 135 are full, the liquid therein will travel around the closed circuit established by the circulating line 135, and will be continuously recycled. When the desired contact time between the liquid and solids is approached, the valve 137 is partially closed to provide a slight throttling effect at that point, and the valve 139 is partially opened while simultaneously partially opening the valve 140. By maintaining a small pressure in the supply line 134 above the back pressure in the withdrawal line 138, processed or exhausted liquid will be constantly withdrawn through the line 138 and fresh liquid may be constantly supplied at the same rate through the supply line 134. This common rate of withdrawal and supply may be adjusted relative to the rate of flow through the closed circuit to provide the required average contact time between the circulating liquid and the solids in the solids-contacting chamber.

With the liquid circulating system of FIG. 5, the liquid may be used to regenerate, rinse, or wash the solid material or may be acted upon by the solid material to perform a desired physical or chemical operation on the liquid, while continuously supplying fresh liquid at a desired rate and continuously withdrawing used or processed liquid at the same rate. At the same time, the solids in the bed 43 are being continuously moved downwardly through the contacting chamber as previously described herein. Depending upon the size and specific gravity of the solid particles in the bed 43 and the rate of flow of liquid upwardly through the bed of solids, the bed of solids may be fluidized to almost any desired degree which will still permit gradual downward movement of the solids through the contacting chamber and out of the bottom thereof.

The liquid circulating system of FIG. 6 is identical with that of FIG. 5 except that the pump 136, valve 137, liquid withdrawal line 138, and its valve 140 are rearranged to reverse the direction of flow in the solids-contacting chamber and in the liquid circulating line 135. Thus, the liquid flow in the solids-contacting chamber of FIG. 6 is downward or co-current with respect to the movement of solids therein. In this case, of course, the liquid handling functions of the tray 28 and perforated toroidal pipe 85 are reversed. In other respects, the modes of operation of the liquid circulating systems of FIGS. 5 and 6 are identical.

The choice between the liquid circulating systems of FIGS. 5 and 6 for any one or all of several superposed solids-contacting chambers, as well as between the other variants of the overall system illustrated in FIGS. 1 to 4, will depend upon the exact character of the overall process and the individual liquid-solid interactions to be performed in the separate chambers. Where a liquid feed contains solid suspended material to be filtered out by the solids through which the liquid travels, downward flow of the liquid in the solids-contacting chamber may be preferred, whereas the reverse relationship may be preferred in a succeeding chamber for washing out of the bed of solids such entrained, foreign solids as may have been filtered out of a liquid feed in the preceding chamber. In most instances, the rate of downward movement of solids in a bed will be so slow relative to the average time of travel of an increment of solids through the bed that the directions of relative flow of liquid and bed solids will have no significant effect on the contact time.

Where the uppermost chamber or group of chambers are to be used for effecting contact of the bed solids with a gaseous fluid, rather than a liquid, basically the same alternative systems of FIGS. 5 and 6 may be employed to circulate a gaseous fluid.

The pressure at any point in any one of the solids-contacting chambers may obviously be affected to some degree by the operation of the liquid circulating system associated therewith so as to alter the overall pressure head gradient between the upper liquid level 66 (FIGS. 1, 2, or 4) and the bottom of the column. However, by properly regulating the pressures exerted by the several, independent, liquid circulating systems relative to the normal static pressures that would otherwise exist in the body of liquids in the column, substantial irregularities in the overall pressure gradient through the column may be avoided, so that there will be no pronounced tendency for liquid flow from one solids-contacting chamber to another, i.e., the fluid contact of each transfer zone and of the outlet zone at the bottom of the column will be in substantially static communication with the fluid contents of the respective, adjacent, interaction zones.

While the invention, for greater brevity, has been described in detail only with reference to the handling of liquid fluids in an ion exchange system, it will be appreciated from the preceding general discussion of the invention that its value and its many advantageous features will be equally useful in a wide variety of processes in which solids are sequentially contacted by a plurality of different fluids, regardless of whether the fluids are liquid or gaseous or include both liquids and gases, and regardless of whether (for example) the interaction between the liquids and the solids is strictly a chemical reaction, or is of a catalytic character, or is basically a solids filtration process or (in reverse) a solids dispersion process, or is even a mere heat exchange process, or is some combination of all or part of these. A principal objective of the invention being to provide a manipulative method and apparatus for practically universal use in performing multiple liquid-solids contacting operations, the above and other applications of the invention in practice are all contemplated and will naturally occur to those skilled in the respective arts involved.

Having described my invention, I claim:

1. Apparatus for continuous interaction of solids and fluids, comprising a vertically elongated, columnar, hollow shell; a plurality of horizontal partitions disposed in vertically spaced relationship for respectively defining a corresponding plurality of solids-contacting chambers thereabove in said shell; a corresponding plurality of horizontally disposed solids supporting trays in said chambers, said trays being respectively associated with said partitions and each tray being disposed above its associated partition in closely spaced relationship therewith; at least one pair of radially offset vertical openings respectively passing each tray and associated partition and connected for defining an outlet passageway from the bottom of each chamber, which passageway first passes the tray, then leads radially and horizontally over the associated partition, and then passes the partition; means for progressively feeding essentially solid particulate material, at a substantially uniform average rate in terms of quantity per unit of time, into the uppermost of said chambers adjacent the top thereof for movement downwardly by gravity to form a bed of the solid particles therein, means for progressively and positively moving solid particles from the bottoms of beds of such particles in each of said chambers and through the outlet passageways at the bottoms of each of said chambers at substantially the same average rate, whereby a bed of said particles may be maintained in each of said chambers while progressively replacing the particles in each bed by movement of particles downwardly through said chambers from the top of the shell to the bottom thereof, and separate means associated with each of said chambers and independent of the aforesaid passageways between chambers for continuously passing a fluid stream into each of said chambers adjacent one end thereof, along a vertical path through a bed of solid particles therein, and out of the chamber adjacent the opposite end thereof, whereby said fluid streams may respectively flow through separate beds of solid particles that are being progressively moved downwardly through the apparatus.

2. The apparatus of claim 1 in which said means for passing fluid into, through, and out of at least one of said chambers includes conduits connected thereto for recirculating at least a portion of the fluid therethrough following its withdrawal.

3. The apparatus of claim 1 in which said means for passing fluid into, through, and out of at least one of said chambers includes means establishing a closed circuit for recirculating at least a part of the fluid therethrough, means for progressively withdrawing fluid from said circuit after passing through the chamber, and means for feeding make-up fluid into said circuit at a location in the circuit between the point of fluid withdrawal and the point of introduction of fluid into the chamber.

4. The apparatus of claim 1, including means for passing said fluid streams upwardly through the respective chambers from inlet openings distributed over the upper surfaces of said trays and for withdrawing the streams from said chambers above a bed of said solid particles therein.

5. The apparatus of claim 1, including means for passing said fluid streams downwardly through the respective chambers from inlet openings above the beds of solid particles therein and for withdrawing the streams through outlet openings distributed over the upper surface of said trays.

6. Apparatus according to claim 1 in which the means for passing a fluid stream into, through, and out of at least one of said solids-contacting chambers includes perforations in the associated tray for passing the fluid therethrough, means connected to the underside of said tray for defining a fluid chamber therein in communication with said perforations, and a conduit extending into the solids-contacting chamber in communication with said fluid chamber in the tray.

7. The apparatus of claim 1, including a hollow shaft extending vertically within said column from adjacent the bottom to adjacent the top thereof, an outlet opening from said shaft adjacent the upper end of the column and above the uppermost of said beds, means for withdrawing solid particulate material from the bottom of the lowermost of said beds, and means for forcing the withdrawn solid particles upwardly through said hollow shaft to said outlet opening therefrom for gravity fall onto the uppermost of said beds.

8. The apparatus of claim 1, including a hollow shaft extending vertically within said column from adjacent the bottom to adjacent the top thereof, an outlet opening from said shaft adjacent the upper end of the column and above the uppermost of said beds, means for withdrawing solid particulate material from the bottom of the lowermost of said beds, means for forcing the withdrawn solid particles upwardly through said hollow shaft to said outlet opening therefrom for gravity fall onto the uppermost of said beds, and means associated with said outlet opening of the shaft and with said passageways between superposed chambers for restricting flow of solid particles onto the tops of each of said beds as the particles are discharged from said hollow shaft and from said passageways between said chambers.

9. A method of effecting continuous interaction between a particulate solid material and a plurality of fluids, respectively, in sequence in successive, spaced zones of a vertically elongated columnar shell, comprising maintaining a plurality of superposed, spaced, beds of particles of said material within the shell in respective, spaced, interaction zones, each pair of successive interaction zones being continually in open communication through an intervening transfer zone, progressively feeding particles of said material downwardly onto the uppermost of said beds at a selected average rate in terms of quantity per unit of time, progressively moving particles at the same average rate downwardly from zone to zone from the bottom of one bed, through the intervening transfer zone, and onto the top of the next lower bed, and finally downwardly from the bottom of the lowermost bed, introducing separate streams of said fluids into each of said interaction zones, respectively, then along vertical paths through said beds therein, and then out of said zones, and controlling the flow of said streams to maintain fluid pressures in said zones that are balanced to prevent any substantial flow of any of said fluids from one interaction zone to another through any of said transfer zones.

10. A method of effecting continuous interaction between a particulate solid material and a plurality of fluids, respectively, in sequence in successive spaced zones of a vertically elongated columnar shell, comprising maintaining a corresponding plurality of self-sustaining, superposed beds of particles of said material within the shell in respective superposed, spaced, interaction zones, each pair of successive interaction zones being continually in open communication through an intervening transfer zone of substantially smaller effective cross-section than said interaction zones; progressively feeding particles of said material downwardly onto the uppermost of said beds at a selected average rate in terms of quantity per unit of time, progressively moving particles at the same average rate downwardly through said beds and from zone to zone from the bottom of one bed, through the intervening transfer zone, and onto the next lower bed, and finally from the bottom of the lowermost bed through an outlet zone; introducing separate streams of said fluids into said interaction zones, respectively, then moving said streams along vertical paths through said beds and then out of said zones; maintaining said transfer zones and said outlet zones full of fluid in substantially static communication with the fluid content of the respective, adjacent interaction zones, and, for each interaction zone, regulating the rate of withdrawal of fluid from said stream relative to the rate of introduction thereof into said stream so as to maintain fluid pressures in the several interaction zones that are balanced to prevent any substantial flow of the fluids from one interaction zone into another, whereby the fluids in said transfer zones are maintained in a substantially immobile condition.

11. The method of claim 10 in which the several rates of flow of said streams of fluid into and out of each of said interaction zones are different and are independently adjusted to provide the desired rates of interaction of liquids and solids in the several interaction zones.

References Cited in the file of this patent

UNITED STATES PATENTS

| | | |
|---|---|---|
| 2,560,356 | Leidholm | July 10, 1951 |
| 2,719,206 | Gilmore | Sept. 27, 1955 |
| 2,804,379 | Wistrich | Aug. 27, 1957 |
| 2,883,332 | Wickham | Apr. 21, 1959 |